(12) United States Patent
Liang

(10) Patent No.: US 9,383,858 B2
(45) Date of Patent: Jul. 5, 2016

(54) METHOD AND DEVICE FOR EXECUTING AN OPERATION ON A MOBILE DEVICE

(71) Applicant: Guangzhou UCWEB Computer Technology Co., Ltd., Guangdong (CN)

(72) Inventor: Jie Liang, Guangdong (CN)

(73) Assignee: Guangzhou UCWEB Computer Technology Co., Ltd, Guangdong (CN)

( * ) Notice: Subject to any disclaimer, the term of this patent is extended or adjusted under 35 U.S.C. 154(b) by 0 days.

(21) Appl. No.: 14/281,652

(22) Filed: May 19, 2014

(65) Prior Publication Data

US 2014/0253441 A1 Sep. 11, 2014

Related U.S. Application Data

(63) Continuation of application No. PCT/CN2012/085011, filed on Nov. 22, 2012, and a continuation of application No. PCT/CN2012/085424, filed on Nov. 28, 2012.

(30) Foreign Application Priority Data

Nov. 23, 2011 (CN) .......................... 2011 1 0376703
Dec. 22, 2011 (CN) .......................... 2011 1 0436148

(51) Int. Cl.
G06F 3/041 (2006.01)
G06F 3/046 (2006.01)
G06F 3/0488 (2013.01)

(52) U.S. Cl.
CPC .............. *G06F 3/0416* (2013.01); *G06F 3/046* (2013.01); *G06F 3/04883* (2013.01)

(58) Field of Classification Search
None
See application file for complete search history.

(56) References Cited

U.S. PATENT DOCUMENTS

2008/0036743 A1* 2/2008 Westerman et al. .......... 345/173
2011/0055753 A1 3/2011 Horodezky et al.
2011/0109561 A1 5/2011 Lee et al.

FOREIGN PATENT DOCUMENTS

| CN | 1673939 A | 9/2005 |
| CN | 102037435 A | 11/2009 |
| CN | 102084325 A | 11/2009 |
| CN | 102023797 A | 4/2011 |
| CN | 102122229 A | 7/2011 |
| CN | 102129312 A | 7/2011 |
| CN | 102243662 A | 11/2011 |
| CN | 102436341 A | 5/2012 |
| CN | 102520845 A | 6/2012 |

* cited by examiner

*Primary Examiner* — Kenneth B Lee, Jr.
(74) *Attorney, Agent, or Firm* — Alston & Bird LLP

(57) ABSTRACT

The disclosure provides a method and device a method for detecting and receiving an induction signal induced by a contact of a pointing object with the touch screen, identifying information corresponding to the induction signal in response to receipt of the induction signal, determining a control operation based on the information, and executing the control operation in response to the determination. The control operation comprises at least one of closing a present application interface and displaying a new application interface.

18 Claims, 10 Drawing Sheets

METHOD AND DEVICE FOR EXECUTING AN OPERATION ON A MOBILE DEVICE

CROSS-REFERENCE TO RELATED APPLICATION

This application claims priority to PCT/CN2012/085011, filed Nov. 22, 2012, which claims priority to Chinese Application No. 201110376703.0, filed on Nov. 23, 2011, and PCT/CN2012/085424, filed Nov. 28, 2012, which claims priority to Chinese Application No. 201110436148.6, filed Dec. 22, 2011, the entire contents each of which is incorporated herein by reference in their entireties.

TECHNICAL FIELD

The disclosure relates to the field of user control of an electronic device, and more specifically, relates to a method and a device for executing an operation in response to an induction signal on a touch screen device, such as mobile terminal.

BACKGROUND

With development of wireless communications, more and more people use their touch screen device to browse the internet, send instant messages, play games and play multimedia content, among other uses. Users may close applications, open new applications and switch between applications frequently. In some instances, user may desire to enter into a thumbnail interface. For example, a user may return from a specific picture to a thumbnail interface of a number of pictures by pressing a physical button. Traditionally, operations associated with closing applications, opening new applications, switching between applications and entering into thumbnail interface may be performed by managing a management list or adding a physical button to achieve the operation. However, operations on the management list may be complicated, time-consuming, and costly. Physical buttons may also increase hardware cost.

BRIEF SUMMARY

Through applied effort, ingenuity, and innovation, solutions to improve methods, apparatus and touch screen devices have been realized and are described herein. Methods and touch screen devices are described herein that provide improved operation interface such as displaying a new application interface in response to receipt of one or more induction signals. Embodiments of the disclosure describe closing a present application interface and/or displaying a new application interface in response to receipt of one or more induction signals. Methods and touch screen devices are described herein that provide an improved way to enter into thumbnail interface by applying a drag signal to a predetermined area.

According to one exemplary embodiment of the subject disclosure, a method for executing an operation on a touch screen of a mobile device is provided. The method comprises detecting and receiving an induction signal induced by a contact of a pointing object with the touch screen, identifying information corresponding to the induction signal in response to receipt of the induction signal, determining a control operation based on the information, and executing the control operation in response to the determination. The control operation comprises at least one of closing a present application interface and displaying a new application interface.

One exemplary embodiment of the subject disclosure is a device for executing an operation on a touch screen of a mobile terminal. The device comprises a detecting unit configured to detect and receive an induction signal induced by a contact of a pointing object with the touch screen. The device may identify information corresponding to the induction signal in response to receipt of the induction signal, determine a control operation based on the information, and execute the control operation in response to the determination. The control operation may comprise at least one of closing a present application interface and displaying a new application interface.

Another exemplary embodiment of the subject disclosure is a computer program product comprising a non-transitory computer readable storage medium and computer program instructions stored therein. The computer program instructions comprise program instructions configured to detect and receive an induction signal induced by a contact of a pointing object with the touch screen, identify information corresponding to the induction signal in response to receipt of the induction signal, determine a control operation based on the information, and execute the control operation in response to the determination. The control operation may comprise at least one of closing a present application interface and displaying a new application interface.

These characteristics as well as additional features, functions, and details of various embodiments are described below. Similarly, corresponding and additional embodiments are also described below.

BRIEF DESCRIPTION OF THE DRAWINGS

Figure 1:
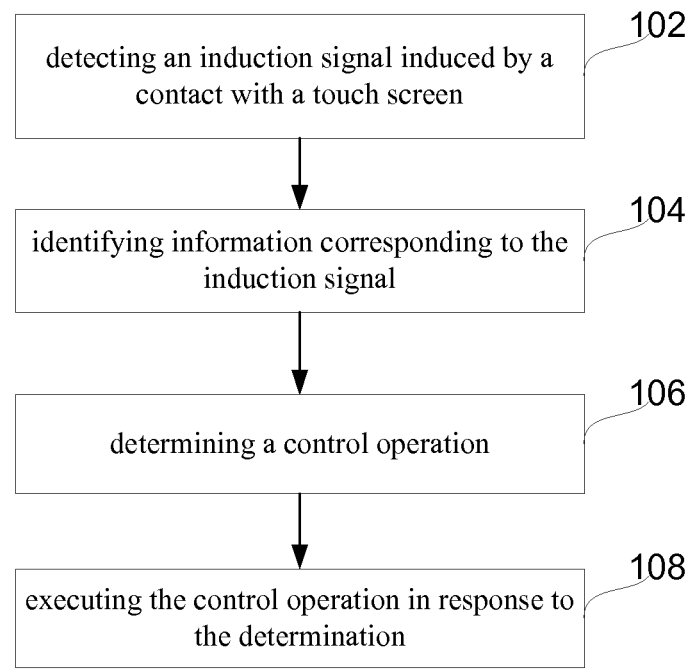
Figure 2:
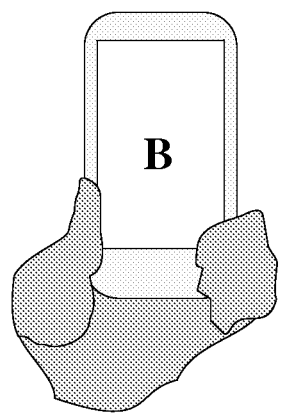
Figure 5:
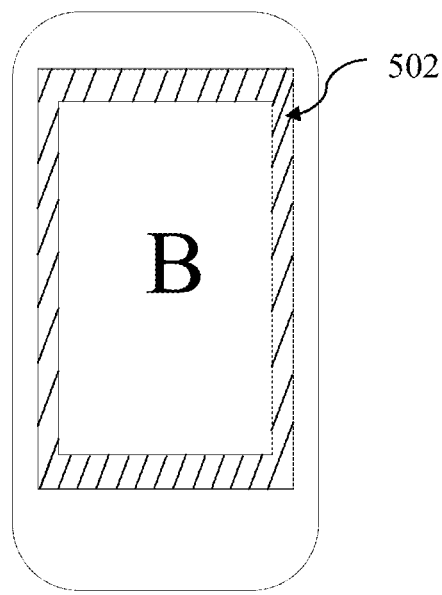
Figure 12:
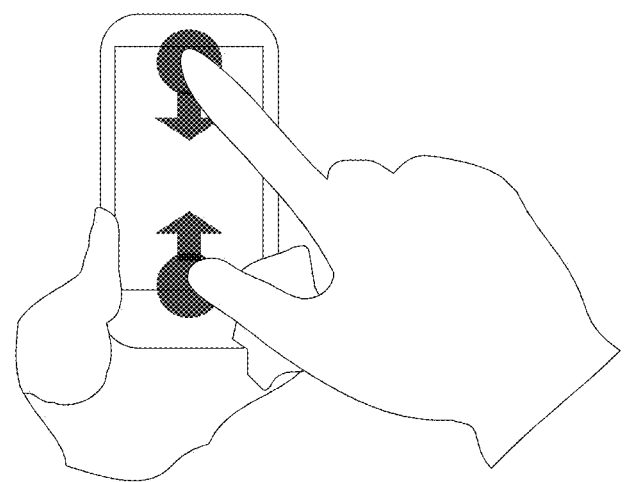
Figure 13:
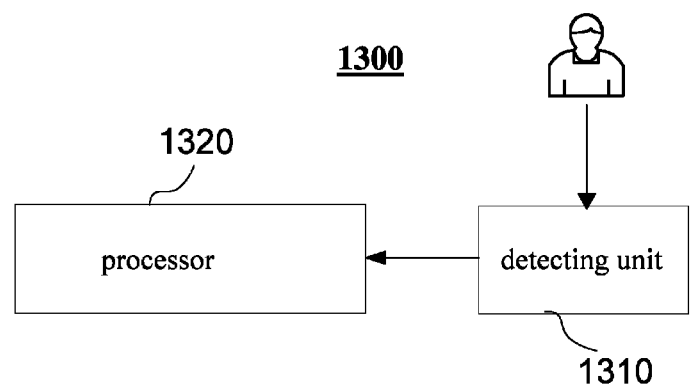
Figure 14:
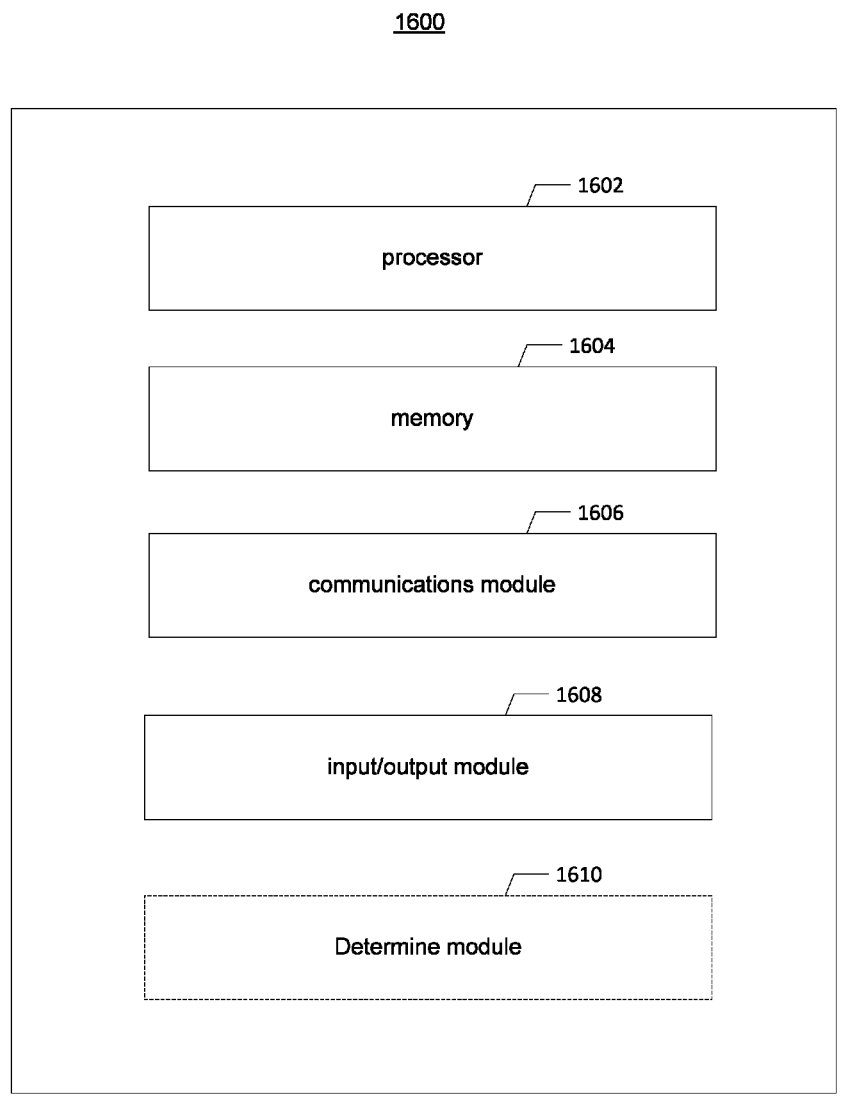

Having thus described some embodiments in general terms, reference will now be made to the accompanying drawings, which are not necessarily drawn to scale. The embodiments illustrated in the figures of the accompanying drawings herein are by way of example and not by way of limitation, and wherein:

FIG. 1 is a flow chart illustrating a method of executing an operation on a touch screen of a mobile device in accordance with exemplary embodiments of the disclosure;

FIG. 2 is a schematic diagram of a mobile terminal in accordance with exemplary embodiments of the disclosure;

FIGS. 3A, 3B, 3C and 3D are schematic diagrams illustrating operations for controlling application interfaces by two induction signals in accordance with exemplary embodiments of the disclosure;

FIGS. 4A, 4B, 4C and 4D are schematic diagrams illustrating operations of controlling application interfaces by one induction signal in accordance with exemplary embodiments of the disclosure;

FIG. 5 is a schematic diagram of a mobile terminal having a predetermined area in accordance with exemplary embodiments of the disclosure;

FIGS. 6-11 are diagrams illustrating operations executed in a predetermined area of a touch screen in accordance with exemplary embodiments of the disclosure;

FIG. 12 is a diagram illustrating a block diagram of a device for executing operations in accordance with exemplary embodiments of the disclosure;

FIG. 13 illustrates a block diagram of a device for executing operations in accordance with exemplary embodiments of the disclosure; and FIG. 14 illustrates a schematic diagram of example circuitry in accordance with exemplary embodiments of the disclosure.

DETAILED DESCRIPTION OF THE EMBODIMENTS

The subject disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In this regard, reference may be made herein to a number of mathematical or numerical expressions or values, and to a number of positions of various components, elements or the like. It should be understood, however, that these expressions, values, positions or the like may refer to absolute or approximate expressions, values or positions, such that exemplary embodiments may account for variations that may occur in the multi-channel optical cell, such as those due to engineering tolerances. Like numbers refer to like elements throughout.

As used herein, the word "exemplary" is used herein to refer to serving as an example, instance, or illustration. Any aspect, feature, function, design, etc. described herein as "exemplary" or an "example" or "examples" is not necessarily to be construed as preferred or advantageous over other aspects, features, functions, designs, etc. Rather, use of the word exemplary is intended to present concepts in a concrete fashion.

FIG. 1 is a flow chart illustrating a method of executing an operation on a touch screen of an electronic device, such as a mobile device ("exemplary" as used herein referring to "serving as an example, instance or illustration"). When a user desires to operate an application and/or an interface on a touch screen of an electronic device, such as closing present applications and/or displaying new applications, a pointing object, such as a user's finger (s), may come into contact with the touch screen to induce one or more induction signals. The induction signals may be sensed and detected by a detecting unit of the touch screen at step S102. A processor embedded in the device may be configured to identify information associated with the induction signal at step S104. The information may comprise a gesture and a direction in which the gesture applied to the touch screen. For example, the gesture may be a single tap, double-tap and/or a drag gesture. The information associated with the induction signal may be saved in a memory. Based on the acquired and identified information, the processor or a determination module may determine a control operation at step S106. The determination may be made by comparing the information to data saved in a pre-established data base. The information associated with the induction signal and/or the pre-established data base may be saved in a memory. Displaying a new application may comprise displaying a new interface, such as displaying a thumbnail interface. Thumbnail interfaces may comprise one or more images each of which represents a corresponding application. Displaying a new application may also comprise initiating a new application. Once the processor and/or the determination module determine the control operation, the processor may execute the control operation at step S108. For example, if the operation is determined to be associated with displaying a new application, the processor may close the present application and display a new application on the touch screen. For another example, if the operation is determined to be associated with entering into a thumbnail interface, the processor may close the present application interface and then display thumbnail images each of which is associated with an application.

FIG. 2 is a schematic diagram of a mobile terminal in accordance with exemplary embodiments of the disclosure. For brevity and convenience, an application or interface being displayed on the touch screen may be defined as a present application or a present interface. An icon associated with a present application or present interface is defined as a present icon. For example, icon B shown in FIG. 2 is a present icon and is associated with a present application. An application to be displayed after the present application is closed may be defined as a new application. An icon associated with the new application or new interface may be defined as a new icon.

Figure 3A:
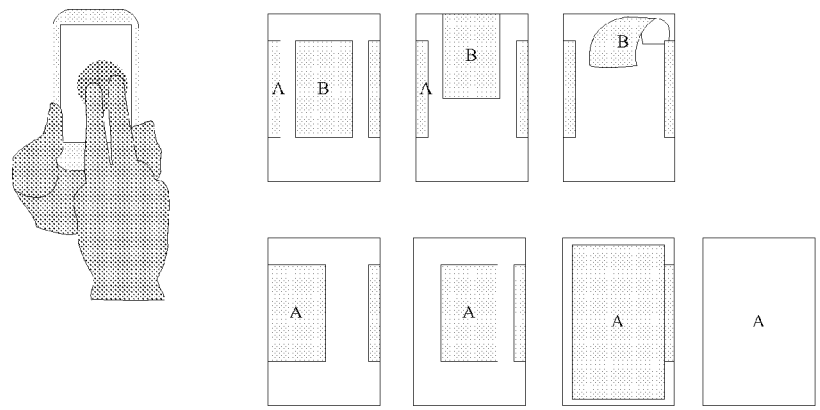
Figure 3B:
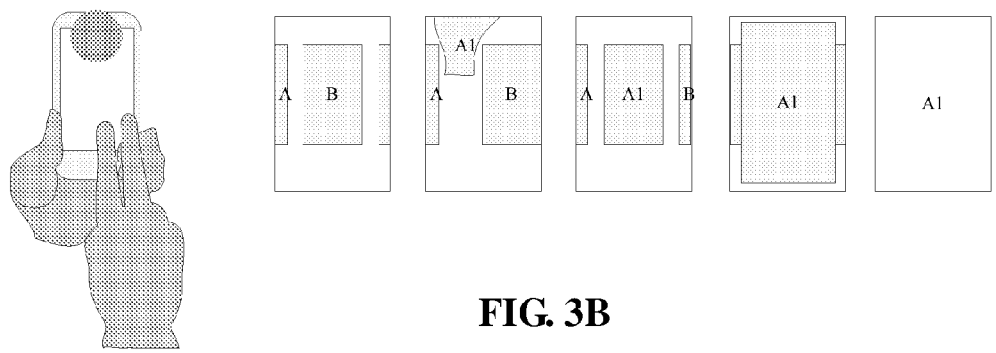
Figure 3C:
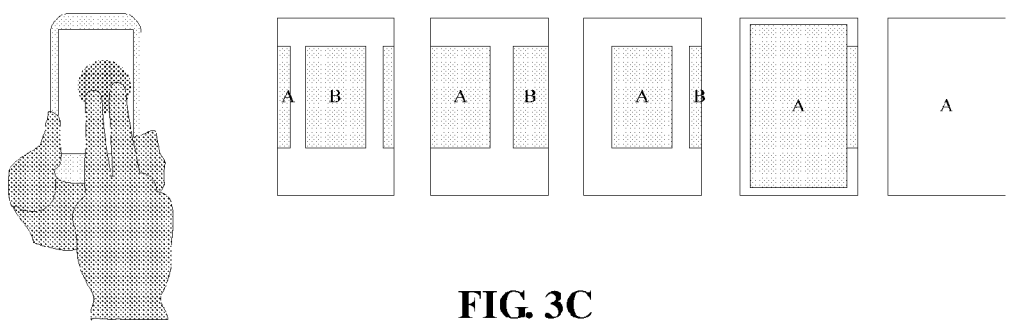
Figure 3D:
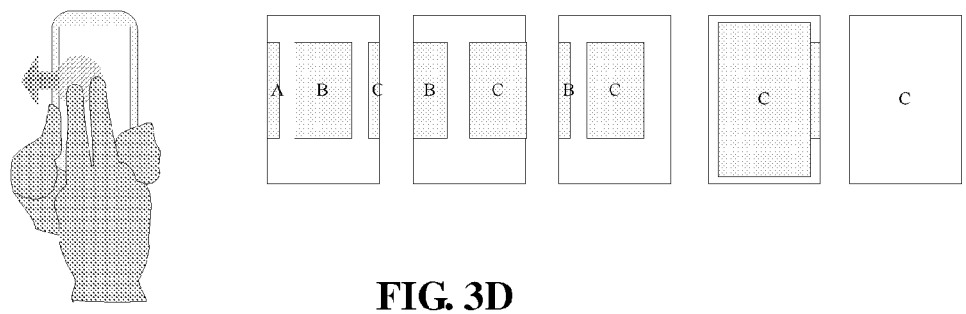
Figure 4A:
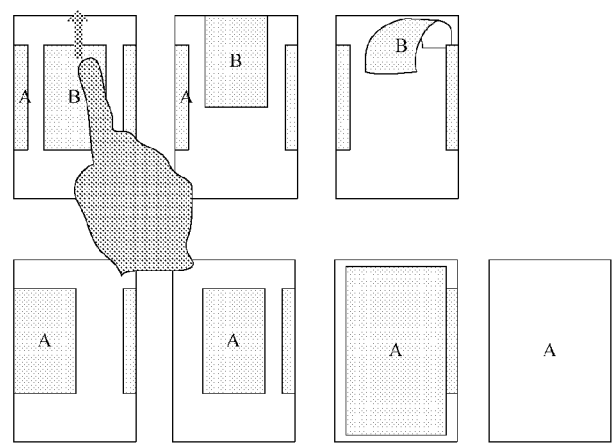
Figure 4B:
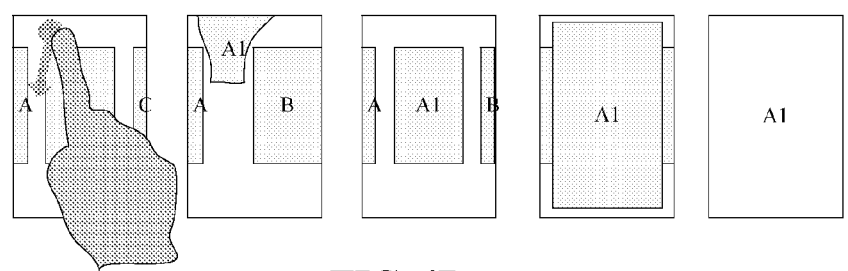
Figure 4C:
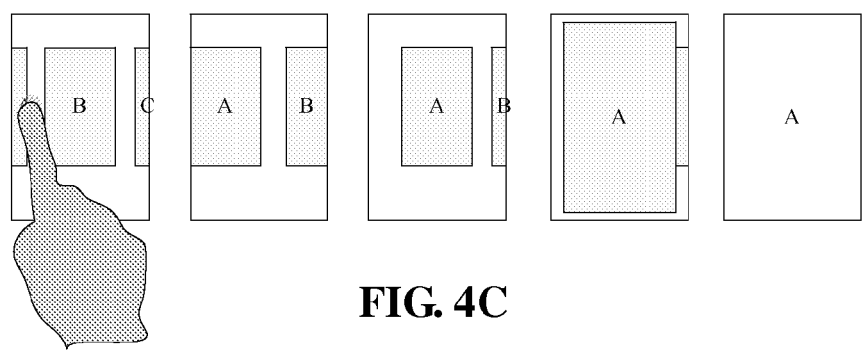
Figure 4D:
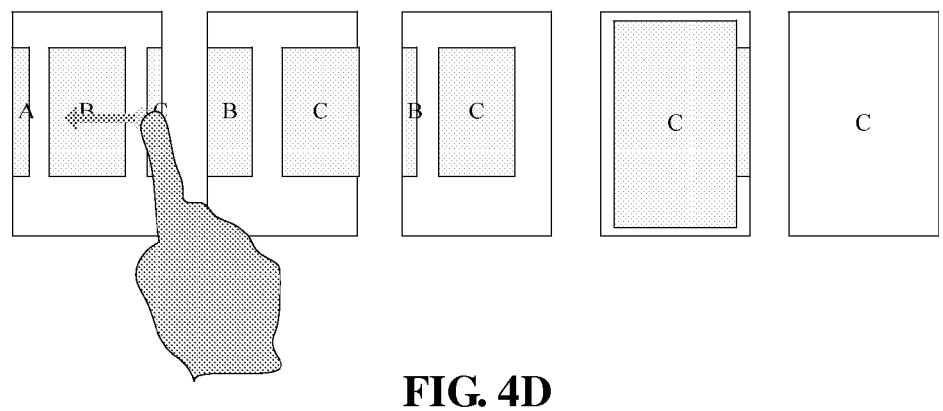

One or more fingers of a user may come into contact with the touch screen to induce one or more induction signals. FIGS. 3A, 3B, 3C and 3D are schematic diagrams illustrating operations for controlling application interfaces by two induction signals. FIGS. 4A, 4B, 4C and 4D are schematic diagrams illustrating operations of controlling application interfaces by one induction signal. In embodiments illustrated by FIGS. 3A-3D, the processor may identify and determine that two induction signals are received and each induction signal is induced by a drag gesture. The processor may further determine directions in which the two induction signals are received. For example, the processor may determine that the two induction signals may be received in similar directions, such as both are executed in an upward, downward, leftward, or rightward direction. The two induction signals and direction in which the two induction signals are executed may be associated with pre-defined control operations. For example, referring to FIG. 3A, when the two induction signals are performed upward, a pre-defined control operation may comprise entering into thumbnail interface, closing the present application by moving the present icon (such as icon B) upward. The present application may also be closed by moving the present icon downward, leftward or rightward. A new icon (such as icon A) may be moved to centre of the screen and a new application may then be displayed in full-screen allowing user to use the entire screen for browsing. The new icon may be on left, right, top or bottom side of the present icon. The application associated with the new icon A may then serve as a present application. In FIG. 3B, the two induction signals may be performed downward. A pre-defined control operation may comprise entering into a thumbnail interface, displaying a new icon (such as icon A1) between two adjacent icons (such as A and B), and then displaying the application associated with the new icon A1 in full-screen. The application associated with the new icon may then serve as a present application. In FIG. 3C, the two induction signals may be performed rightward. A pre-defined control operation may comprise entering into a thumbnail interface, closing the present application by moving away the present icon (such as icon B) from centre of the screen, moving a new icon (such as icon A) to the centre of the screen, and displaying the application associated with the new icon A in full-screen. The new icon may be on left, right, top, or bottom side of the present icon. The application associated with the new icon may then serve as a present application. In FIG. 3D, the two induction signals may be performed leftward. A pre-defined control operation may comprise entering into a thumbnail interface, closing the present application by moving away the present icon (such as icon B), moving a new icon (such as icon C) to centre of the screen, and displaying the application associated with the new icon in full-screen. The new icon may be on right, left, top, or bottom side of the present icon. The application associated with the new icon may then serve as a present application. The present application may be closed by moving the associated icon upward, downward, leftward, or rightward. The new icon may be on left, right, top or bottom side of the present icon.

A single induction signal may achieve similar results as those achieved by double induction signals. In embodiments illustrated by FIGS. 4A-4D, a processor may identify and determine that one induction signal is received, and the received induction signal is caused by a drag gesture. The processor may further determine a direction in which the induction signal is received. The results achieved in FIGS. 4A, 4B, 4C and 4D may correspond to those of FIGS. 3A, 3B, 3C and 3D respectively.

In some embodiments, the one or more induction signals may be applied to a predetermined area which may cause the processor to execute corresponding control operations, such as entering into a thumbnail interface. FIG. 5 is a schematic diagram of a mobile terminal having a predetermined area 502 in accordance with exemplary embodiments of the disclosure. The predetermined area 502 may be along a peripheral edge area of the touch screen. The peripheral edge area may comprise top, bottom, left, and/or right edge areas. The top edge area and the bottom edge area may be defined as opposite edge areas. The left edge area and the right edge area may be defined as opposite edge areas. When the touch screen detects receipt of one or more induction signals in the predetermined area 502, the processor and/or the determination module may determine information associated with the induction signals. For example, the processor and/or the determination module may determine the number of induction signals the touch screen receives. The processor and/or the determination module may also determine that each induction signal is induced by a drag gesture. The processor and/or the determination module may further determine in which direction each induction signal is applied and/or on which pre-determined edge area the induction signal is applied to. The result achieved by the processor may be compared to data saved in a pre-established data base to determine a control operation. According to the comparison result, the processor may execute the control operation.

Figure 6:
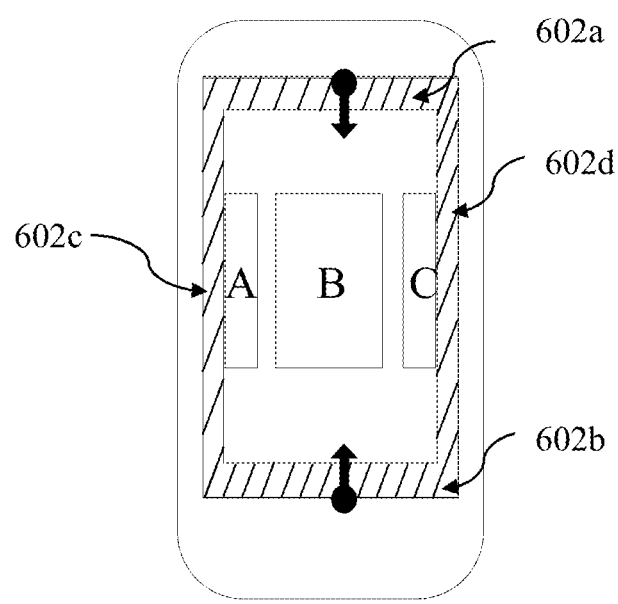
Figure 7:
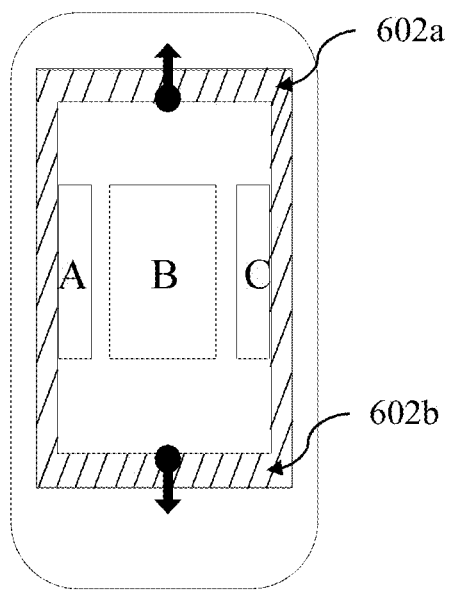

FIGS. 6-11 are diagrams illustrating operations applied to the predetermined area 502 in accordance with exemplary embodiments of the disclosure. In the embodiments illustrated by FIGS. 6-11, the control operation may comprise entering into a thumbnail interface. The control operation of entering into the thumbnail interface may be in response to receipt of one induction signal in the predetermined area. Similarly, the control operation of entering into the thumbnail interface may be in response to receipt of two or more induction signals in the predetermined area. Two induction signals may be simultaneously detected and received by the touch screen. For example, as shown in FIG. 6, one induction signal may be applied to a top edge area 602a in a downward direction while the other induction signal may be applied to a bottom edge area 602b in an upward direction. In another example, as shown in FIG. 7, one induction signal may be applied to the top edge area 602a in an upward direction. The other induction signal may be applied to the bottom edge area 602b in a downward direction. Although it is not shown in FIGS. 6 and 7, the two induction signals may also be simultaneously detected and received in a left edge area 602c and a right edge area 602d in opposite directions. For example, one induction signal may be received in the left edge area 602c and applied in the leftward direction, and the other induction signal may be received in the right edge area 602d and applied in the rightward direction. For another example, one induction signal may be received in the left edge area 602c and is applied in the rightward direction and the other induction signal may be received in the right edge area 602d and is applied in the leftward direction. The two induction signals may also be applied in opposite edge areas in the same direction to cause the processor to execute a control operation.

Figure 8:
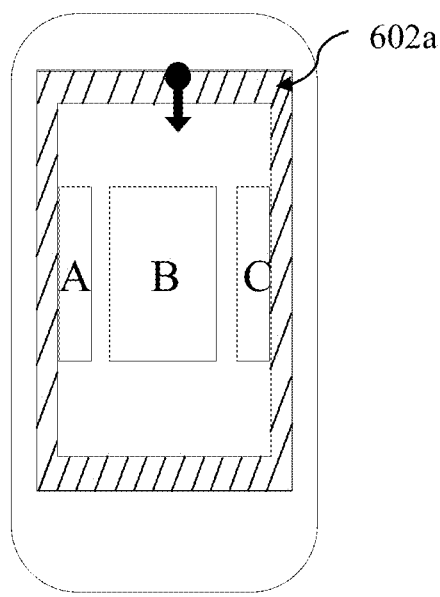
Figure 9:
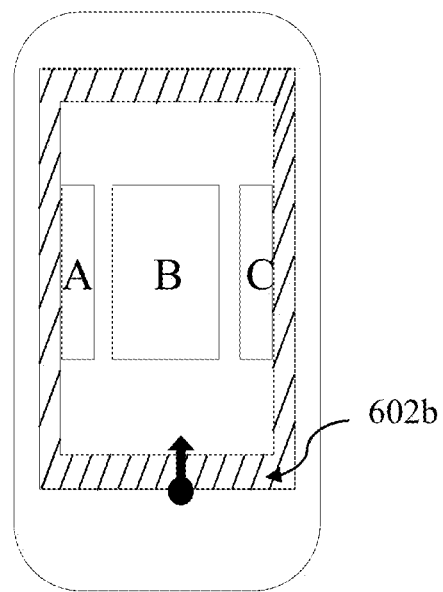
Figure 10:
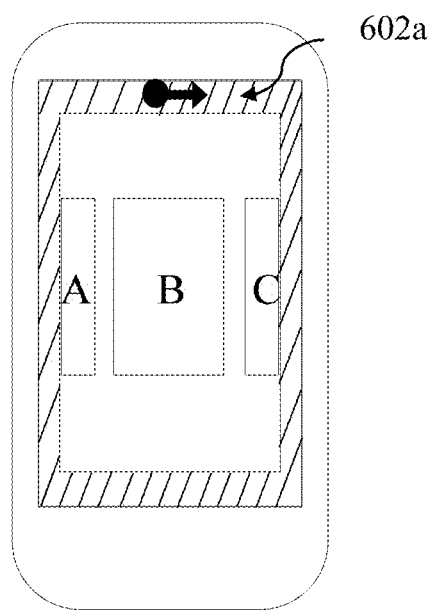
Figure 11:
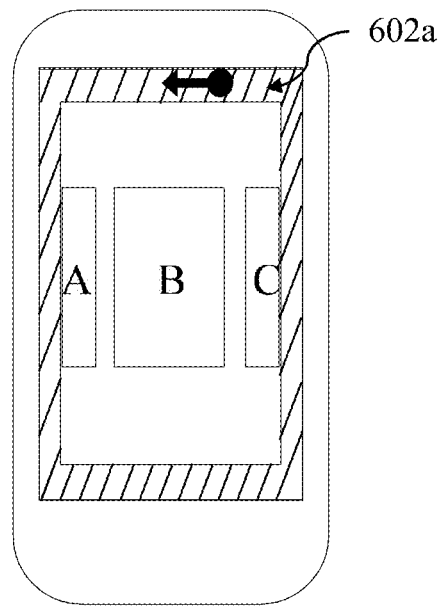

The control operation of entering into the thumbnail interface may also be in response to receipt of one induction signal. The induction signal may be received in the top edge area or the bottom edge area in an upward, downward, leftward, or rightward direction. The induction signal may also be received in the left edge area or the right edge area in an upward, downward, leftward, or rightward direction. As illustrated in FIGS. 8-11, an induction signal may be detected and received in the top edge area 602a in a downward direction (FIG. 8). The induction signal may be detected and received in the bottom edge area 602b in an upward direction (FIG. 9). The induction signal may be detected and received in the top edge area 602a in rightward direction (FIG. 10). The induction signal may be detected and received in the top edge area 602a in a leftward direction (FIG. 11). Although it is not shown, the induction signal may also be received in the left edge area or the right edge area in one of an upward, downward, leftward, or rightward direction.

FIG. 12 is a diagram illustrating an execution of entering into a thumbnail interface in accordance with exemplary embodiments of the disclosure. FIG. 13 illustrates a block diagram of a device 1300 for executing an operation. The device 1300 may comprise a detecting unit 1310 configured to detect one or more induction signals induced by a contact with the touch screen. The device 1300 may also comprise a processor 1320 configured to identify information associated with the one or more induction signals. The information may comprise a gesture and a direction in which the gesture applied to the touch screen. The gesture may be a single tap, double-tap and/or a drag gesture. Based on the acquired and identified information, the processor 1320 may determine a control operation. The determination may be made by comparing the information to data saved in a pre-established data base. Once the processor 1320 determines the control operation, the processor 1320 may execute the control operation.

The electronic device described above may be a mobile device, such as handheld terminal devices, such as mobile phones, tablets, Personal Digital Assistants (PDA), and the like. Therefore, the scope of protection of the present invention should not be limited to a particular type of electronic device or mobile device.

FIG. 14 shows a schematic block diagram of example circuitry 1600, some or all of which may be included in the mobile device. In accordance with some example embodiments, circuitry 1600 may include various elements, such as one or more processors 1602, memories 1604, communications modules 1606, and/or input/output modules 1608.

As referred to herein, "module" includes hardware, software, and/or firmware configured to perform one or more particular functions. In this regard, the means of circuitry as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 1604) that is executable by a suitably configured processing device (e.g., processor 1602), or some combination thereof.

Processor 1602 may, for example, be embodied as various means for processing including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Processor 1602 may comprise a plurality of means for processing. The plurality of means for processing may be embodied on a single computing device or may be distributed across a plurality of computing devices collectively configured to function as circuitry 1600. The plurality of means for processing may be in operative communication with each other and may be collectively configured to perform one or more functionalities of circuitry 1600 as described herein. In an example embodiment, processor 1602 may be configured to execute instructions stored in memory 1604 or otherwise accessible to processor 1602. These instructions, when executed by processor 1602, may cause circuitry 1600 to perform one or more of the functions described herein.

Whether configured by hardware, firmware/software methods, or by a combination thereof, processor 1602 may comprise an entity capable of performing operations according to embodiments of the present disclosure while configured accordingly. Thus, for example, when processor 1602 is embodied as an ASIC, FPGA, or the like, processor 1602 may comprise specifically configured hardware for conducting one or more operations described herein. As another example, when processor 1602 may be embodied as an executor of instructions, such as may be stored in memory 1604, the instructions may specifically configure processor 1602 to perform one or more algorithms, methods, operations, or functions described herein. For example, processor 1602 may be configured to determine if a pre-defined operation associated with a contact signal induced by a presence of a finger on the touch screen in combination with a movement of the mobile terminal meets conditions of a pre-defined conditional assembly operation.

Memory 1604 may comprise, for example, volatile memory, non-volatile memory, or some combination thereof. Although illustrated in FIG. 13 as a single memory, memory 1604 may comprise a plurality of memory components. The plurality of memory components may be embodied on a single computing component or distributed across a plurality of computing components. In various embodiments, memory 1604 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 1604 may be configured to store information, data, applications, instructions, or the like for enabling circuitry 1600 to carry out various functions in accordance with example embodiments discussed herein. For example, in at least some embodiments, memory 1604 may be configured to buffer input data for processing by processor 1602. Additionally or alternatively, in at least some embodiments, memory 1604 may be configured to store program instructions for execution by processor 1602 and/or data for processing by processor 1602. Memory 1604 may store information in the form of static and/or dynamic information. This stored information may be stored and/or used by circuitry 1600 during the course of performing its functionalities.

Communications module 1606 may be embodied as any component or means for communication embodied in circuitry, hardware, a computer program product comprising computer readable program instructions stored on a computer readable medium (e.g., memory 1604) and executed by a processing device (e.g., processor 1602), or a combination thereof that is configured to receive and/or transmit data from/to another device, such as, for example, a second circuitry 1600 and/or the like. In some embodiments, communications module 1606 (like other components discussed herein) can be at least partially embodied as or otherwise controlled by processor 1602. In this regard, communications module 1606 may be in communication with processor 1602, such as via a bus. Communications module 1606 may include, for example, an antenna, a transmitter, a receiver, a transceiver, network interface card and/or supporting hardware, and/or firmware/software for enabling communications. Communications module 1606 may be configured to receive and/or transmit any data that may be stored by memory 1604 using any protocol that may be used for communications. Communications module 1606 may additionally and/or alternatively be in communication with the memory 1604, input/output module 1608, and/or any other component of circuitry 1600, such as via a bus. Communications module 1606 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

Input/output module 1608 may be in communication with processor 1602 to receive an indication of an input and/or to provide an audible, visual, mechanical, or other output. In that sense, input/output module 1608 may include means for implementing analog-to-digital and/or digital-to-analog data conversions. Input/output module 1608 may include support, for example, for a display, touch screen, keyboard, button, click wheel, mouse, joystick, an image capturing device, microphone, speaker, biometric scanner, and/or other input/output mechanisms. In embodiments where circuitry 1600 may be implemented as a server or database, aspects of input/output module 1608 may be reduced as compared to embodiments where circuitry 1600 may be implemented as an end-user machine or other type of device designed for complex user interactions. In some embodiments (like other components discussed herein), input/output module 1608 may even be eliminated from circuitry 1600. Alternatively, such as in embodiments wherein circuitry 1600 is embodied as a server or database, at least some aspects of input/output module 1608 may be embodied on an apparatus used by a user that is in communication with circuitry 1600. Input/output module 1608 may be in communication with memory 1604, communications module 1606, and/or any other component(s), such as via a bus. Although more than one input/output module and/or other component can be included in circuitry 1600, only one is shown in FIG. 16 to avoid overcomplicating the disclosure (e.g., like the other components discussed herein).

In some embodiments, determining module 1610 may also or instead be included and configured to perform the functionality discussed herein related to determining the pre-defined control operation. In some embodiments, some or all of the functionality of determining module 1610 may be performed by processor 1602. In this regard, the example processes discussed herein can be performed by at least one processor 1602 and/or determining module 1610. For example, non-transitory computer readable storage media can be configured to store firmware, one or more application programs, and/or other software, which include instructions and other computer-readable program code portions that can be executed to control processors of the components of circuitry 1600 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor, and/or other programmable apparatus's circuitry to produce a machine, such that the computer, processor, or other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various forms, including entirely of hardware or any combination of software and hardware. Furthermore, embodiments may take the form of a computer program product on at least one non-transitory computer readable storage medium having computer readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to components, such as functional modules, system components, and circuitry. Below is a discussion of an example process flow chart describing functionality that may be implemented by one or more components and/or means discussed above and/or other suitably configured circuitry.

According to one aspect of the subject disclosure, an apparatus of exemplary embodiments of the subject disclosure generally operates under control of a computer program. The computer program for performing the methods of exemplary embodiments of the disclosure may include one or more computer-readable program code portions, such as a series of computer instructions, embodied or otherwise stored in a computer-readable storage medium, such as the non-volatile storage medium.

FIG. 1 is a flow chart reflecting processes and control of methods, systems, and computer programs according to exemplary embodiments of the disclosure. It will be understood that each block or step of the flow chart, and combinations of blocks or steps in the flow chart, may be implemented by various means, such as hardware alone or in combination with firmware, and/or software including one or more computer program instructions. As will be appreciated, any such computer program instructions may be loaded onto a computer, special purpose computer, or other programmable data processing apparatus, such as processor 1602, to produce a machine, or machines, such that the computer program product includes the instructions which execute on the computer or other programmable data processing apparatus (e.g., hardware) to create means for implementing the functions described herein, such as the functions specified in the block(s) or step(s) of the flow chart of FIG. 1.

These computer program instructions may also be stored in a computer-readable storage device (e.g., memory 1604) that may direct a computer or other programmable data processing apparatus to function in a particular manner, such that the instructions stored in the computer-readable storage device produce an article of manufacture including instruction computer-readable instructions for implementing the functions described herein, such as the functions specified in the block(s) or step(s) of the flow chart of FIG. 1. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions described herein, such as the functions specified in the block(s) or step(s) of the flow chart of FIG. 1.

Accordingly, blocks or steps of the flow chart support means and combinations of means for performing and/or implementing the specified functions, combinations of steps for performing and/or implementing the specified functions and program instruction means for performing and/or implementing the specified functions. It will also be understood that one or more blocks or steps of the flow chart, and combinations of blocks or steps in the flow chart, may be implemented by special purpose hardware-based computer systems which perform the specified functions or steps, or combinations of special purpose hardware and computer instructions.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the disclosure as defined by the appended claims. Although specific terms are employed herein, they are used in a generic and descriptive sense only and not for purposes of limitation.

Although various embodiments of the present invention have been described with reference to the figures, those skilled in the art should understand that various improvements may also be occur to various embodiments mentioned by the present invention without departing from the summary of the present invention. Therefore, the scope of protection of the present invention should be determined by the contents of the appended claims.

Obviously, those skilled in the art should understand that each module or each step of the present invention may be implemented by a general purpose computing device, they may be focused on a single computing device, or may be distributed on the network composed of multiple computing devices. Optionally, they may be implemented by a computing device executable program code, so that they are stored in a storage device for execution by the computing device, or may be implemented by making them into various integrated circuit module respectively, or making multiple modules or steps among them into a single integrated circuit module. In this way, the present invention will not limit the combination of any specific hardware and software.

The above is only the preferred embodiment of the present invention, and not limited to the present invention. For those skilled in the art, the present invention may have various alterations and changes. Any modification, equivalent replacement, improvement and so on within the spirit and principle of the present invention should be contained within the scope of protection of the present invention.

What is claimed is:

1. A method for executing an operation on a touch screen of an electronic device, comprising:

detecting and receiving an induction signal induced by a contact of a pointing object with the touch screen while a first application interface is displayed within a display of the electronic device;
identifying information corresponding to the induction signal in response to receipt of the induction signal;
determining a control operation based on the information; and
executing the control operation in response to the determination,
wherein the control operation comprises removing the first application interface from the display, entering a thumbnail interface including the first application interface and a second application interface, and then displaying the second application interface in a full screen of the display.

2. The method of claim 1, wherein identifying information comprises determining the induction signal is received in a predetermined area.

3. The method of claim 2, wherein the predetermined area comprises a peripheral area along edges of the touch screen.

4. The method of claim 1, wherein identifying information comprises determining a direction in which the induction signal is received.

5. The method of claim 1, wherein identifying information comprises determining the induction signal comprises a drag signal.

6. The method of claim 1, further comprising detecting two induction signals.

7. The method of claim 6, further comprising determining that the two induction signals are received in different directions, opposite directions, or one direction.

8. An apparatus for executing an operation on a touch screen of an electronic device, comprising
a detecting unit configured to detect and receive an induction signal induced by a contact of a pointing object with the touch screen;
a processor configured to:
identify information corresponding to the induction signal in response to receipt of the induction signal while a first application interface is displayed within a display of the electronic device;
determine a control operation based on the information; and
execute the control operation in response to the determination,
wherein the control operation comprises removing the first application interface from the display, entering a thumbnail interface including the first application interface and a second application interface, and then displaying the second application interface in a full screen of the display.

9. The apparatus of claim 8, wherein the processor is further configured to determine the induction signal is received in a predetermined area.

10. The apparatus of claim 8, wherein the processor is further configured to determine the induction signal is induced by a drag gesture.

11. The apparatus of claim 8, wherein the processor is further configured to detect two induction signals.

12. The apparatus of claim 11, wherein the processor is further configured to determine the two induction signals are received in different directions, opposite directions or one direction.

13. The apparatus of claim 8, wherein the processor is further configured to determine a direction in which the induction signal is received.

14. A computer program product comprising a non-transitory computer readable storage medium and computer program instructions stored therein, the computer program instructions comprising program instructions that configure a processor to:
detect and receive an induction signal induced by a contact of a pointing object with a touch screen;
identify information corresponding to the induction signal in response to receipt of the induction signal while a first application interface is displayed within on a display;
determine a control operation based on the information; and
execute the control operation in response to the determination,
wherein the control operation comprises removing the first application interface from the display, entering a thumbnail interface including the first application interface and a second application interface, and then displaying the second application interface in a full screen of the display.

15. The computer program product of claim 14, wherein the program instructions are further configured to determine the induction signal is received in a predetermined area.

16. The computer program product of claim 14, wherein the program instructions are further configured to determine the induction signal is induced by a drag gesture.

17. The computer program product of claim 14, wherein the program instructions are further configured to detect two induction signals.

18. The computer program product of claim 14, wherein the program instructions are further configured to determine the two induction signals are received in different directions, opposite directions or one direction.

* * * * *